United States Patent
Augst

(10) Patent No.: US 11,904,962 B2
(45) Date of Patent: Feb. 20, 2024

(54) DEVICE AND METHOD FOR OPERATING A VEHICLE WHICH CAN BE DRIVEN IN AN AT LEAST PARTLY AUTOMATED MANNER

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 782 days.

(21) Appl. No.: 16/965,704

(22) PCT Filed: Jan. 24, 2019

(86) PCT No.: PCT/EP2019/051729
§ 371 (c)(1),
(2) Date: Jul. 29, 2020

(87) PCT Pub. No.: WO2019/162032
PCT Pub. Date: Aug. 29, 2019

(65) Prior Publication Data
US 2021/0031773 A1 Feb. 4, 2021

(30) Foreign Application Priority Data
Feb. 23, 2018 (DE) ................ 10 2018 202 780.3

(51) Int. Cl.
B62D 6/00 (2006.01)

(52) U.S. Cl.
CPC ............ *B62D 6/007* (2013.01); *B62D 6/001* (2013.01)

(58) Field of Classification Search
CPC ....... B60W 30/18163; B60W 2556/45; B60W 50/10; B62D 6/007; B62D 6/001
See application file for complete search history.

(56) References Cited

U.S. PATENT DOCUMENTS

| | | | |
|---|---|---|---|
| 11,230,292 B2 | 1/2022 | Augst | |
| 2008/0065293 A1 | 3/2008 | Placke et al. | |
| 2012/0179328 A1* | 7/2012 | Goldman-Shenhar ... | B62D 1/06 701/36 |
| 2012/0271500 A1* | 10/2012 | Tsimhoni ................ | B62D 1/28 701/23 |
| 2012/0296528 A1 | 11/2012 | Wellhoefer et al. | |
| 2014/0277896 A1 | 9/2014 | Lathrop et al. | |
| 2014/0365228 A1* | 12/2014 | Ng-Thow-Hing ...... | G06F 3/017 704/275 |
| 2015/0123947 A1* | 5/2015 | Jubner ................ | G06F 3/04842 345/175 |
| 2016/0091083 A1 | 3/2016 | Drees et al. | |
| 2016/0200348 A1 | 7/2016 | Lueke | |
| 2017/0137060 A1 | 5/2017 | Wanner et al. | |
| 2017/0320501 A1* | 11/2017 | Li .......................... | B60K 37/06 |
| 2017/0351256 A1* | 12/2017 | Kumakiri .............. | B60W 40/09 |
| 2018/0029640 A1 | 2/2018 | Otto et al. | |
| 2018/0154932 A1* | 6/2018 | Rakouth ................ | B62D 1/286 |
| 2018/0284798 A1 | 10/2018 | Kita et al. | |
| 2019/0071099 A1* | 3/2019 | Nishiguchi ........ | B62D 15/0255 |
| 2019/0071113 A1 | 3/2019 | Board et al. | |
| 2019/0193788 A1 | 6/2019 | Augst | |
| 2020/0223476 A1 | 7/2020 | Mate et al. | |
| 2020/0307691 A1 | 10/2020 | Kalabic et al. | |
| 2020/0317261 A1 | 10/2020 | Shoji et al. | |

FOREIGN PATENT DOCUMENTS

| | | |
|---|---|---|
| DE | 10 2009 022 055 A1 | 11/2010 |
| DE | 10 2011 076 174 A1 | 11/2012 |
| DE | 10 2013 010 630 A1 | 1/2015 |
| DE | 10 2013 216 931 A1 | 2/2015 |
| DE | 10 2014 207 969 A1 | 10/2015 |
| DE | 10 2014 107 194 A1 | 11/2015 |
| DE | 10 2016 009 709 A1 | 2/2017 |
| DE | 10 2015 118 531 A1 | 5/2017 |
| DE | 10 2015 224 244 A1 | 6/2017 |
| DE | 10 2016 217 772 A1 | 3/2018 |
| EP | 1 807 267 B1 | 8/2008 |
| WO | WO 2015/048959 A1 | 4/2015 |

OTHER PUBLICATIONS

International Search Report (PCT/ISA/210) issued in PCT Application No. PCT/EP2019/051730 dated May 21, 2019 with English translation (eight (8) pages).
German-language Written Opinion (PCT/ISA/237) issued in PCT Application No. PCT/EP2019/051730 dated May 21, 2019 (seven (7) pages).
German-language Search Report issued in German Application No. 10 2018 202 786.2 dated Sep. 4, 2018 with partial English translation (13 pages).
International Search Report (PCT/ISA/210) issued in PCT Application No. PCT/EP2019/051729 dated May 20, 2019 with English translation (eight (8) pages).
German-language Written Opinion (PCT/ISA/237) issued in PCT Application No. PCT/EP2019/051729 dated May 20, 2019 (six (6) pages).
German-language Search Report issued in German Application No. 10 2018 202 780.3 dated Aug. 29, 2018 with partial English translation (13 pages).

* cited by examiner

*Primary Examiner* — Nadeem Odeh
(74) *Attorney, Agent, or Firm* — Crowell & Moring LLP

(57) ABSTRACT

A device is provided for operating a vehicle which can be driven in an at least partly automated manner, the device includes an actuating element which can be operated by a driver for controlling at least the lateral control of the vehicle, and includes a wheel angle adjuster which, when actuated by the actuating element of the driver and/or by an electronic control unit controlling the automated lateral control of the vehicle, controls a steering angle at the steerable wheels of the vehicle. The device is characterized in that the device has at least one so-called interpretation operating mode which differs from a substantially manual operating mode in that one or more operation action(s) initiated by the driver at the actuating element are suitably interpreted in accordance with the degree of haptic contact between the driver and the actuating element.

16 Claims, No Drawings

DEVICE AND METHOD FOR OPERATING A VEHICLE WHICH CAN BE DRIVEN IN AN AT LEAST PARTLY AUTOMATED MANNER

BACKGROUND AND SUMMARY OF THE INVENTION

The invention relates to a device for operating a vehicle which can be driven in at least partially automated fashion, having an actuating element which can be actuated by a driver and which serves for the control of at least the lateral guidance of the vehicle and having a wheel angle setting means which controls a steering angle at the steerable wheels of the vehicle in a manner activated by the actuating element of the driver and/or by an electronic control unit which controls the automated lateral guidance of the vehicle. The invention furthermore relates to a corresponding operating method and to an electronic control unit which is installable in a vehicle and/or is connectable to the vehicle for data exchange, and to a corresponding computer program.

In the German patent application with the file reference 102016217772.9, which does not constitute a prior publication, a device, an operating method and an electronic control unit for controlling a vehicle which can be driven in at least partially automated fashion are described, with which the operating method described in the present documents can advantageously be implemented. Therefore, in the present case, reference is made to the above-cited German patent application, which does not constitute a prior publication, in its entirety; in particular, the content thereof is to be fully incorporated by reference into the disclosure of the present invention. It is however expressly pointed out here that the present invention need not imperatively include features from the cited German patent application 102016217772.9, which does not constitute a prior publication; rather, the present invention may also be realized with an actuating element of some other design which can also be referred to as a steering handle (or in conventional form as a steering wheel).

In the present case, an intelligent interaction between a vehicle which can be driven in automated fashion and a vehicle driver is presented, wherein the driver may also be a user of the vehicle (which may for example be driven in sufficiently automated fashion), which interaction provides the driver or user with a new possibility or a new driving experience (in relation to the hitherto known prior art) (=problem addressed by the invention).

The present invention solves this problem by providing a device for operating a vehicle which is drivable in at least partially automated fashion, having an actuating element which is actuatable by a driver and which serves for control of at least lateral guidance of the vehicle and having a wheel angle adjuster which controls a steering angle at steerable wheels of the vehicle in a manner activated by the actuating element of the driver and/or by an electronic control unit which controls automated lateral guidance of the vehicle. The device has at least one interpretation operating mode which differs from a substantially manual operating mode in that one or more actuating actions imparted by the driver at the actuating element are interpreted in a manner dependent on the degree of haptic contact of the driver with the actuating element.

In a simplified example, the device is configured to interpret a driver demand specified by means of an actuating action. In particular, the at least one actuating action relates to particular lateral guidance of the vehicle or to a (particular) change in the lateral guidance of the vehicle. For example, the actuating action comprises at least one steering demand in a particular direction with a particular steering angle, or a steering angle in a particular value range, a particular wheel setting angle to be attained, or a wheel setting angle in a particular value range. According to the invention, it is possible, depending on the degree of interpretation, for one or more features of an actuating action which are ascertained in an at least partially (at least mechanically) decoupled state of the actuating element, different features or combinations of features of the actuating action to be interpreted as relevant, important or decisive for the interpretation of the actuating action.

The one or more actuating actions imparted by the driver at the actuating element in the or in this case so-called at least one interpretation operating mode are in particular not implemented directly, and/or are not implemented in a fixedly defined proportion, logic or characteristic curve. For example, a physical action of the driver on the actuating element does not need to be proportionally implemented in a wheel angle or in the change of the wheel angle setting. For example, in the at least one interpretation operating mode, a mathematical function, which deviates from a transfer function or proportion of at least one substantially manual mode, between an action, in particular angle change, force in an actuating direction, torque in an (another) actuating direction and/or onto the or on the actuating element, and a wheel angle, or in the change of the wheel angle setting, may be applicable or applied. Preferably, the mathematical function may have a variable time dependency. The time dependency may in turn be selectable or adaptable in a manner dependent on a predetermined condition, for example on an evaluation of a driving situation and/or a traffic situation in the surroundings of the vehicle. In particular, here, the proportion, logic or characteristic curve in accordance with which the at least one movement of the vehicle relates to the at least one actuating input does not correspond to any values fixedly or originally defined for example during development of the vehicle, for example "from the factory".

For example, the vehicle comprises a controller unit which is configured to, in a manner dependent on an actuating action of the driver at the actuating element and/or on an electronic control unit which controls at least the automated lateral guidance of the vehicle (and/or longitudinal guidance of the vehicle), control a steering angle at the steerable wheels of the vehicle. The controller unit may be configured to have one or more features of the device and/or to implement the corresponding method steps of a corresponding operating method. For example, such a controller unit may be installed together with an electrical servo steering system and/or together with a control unit which controls or triggers the at least partially automated or remote-controlled driving.

The interpretation operating mode preferably differs also from a (possibly present) operating mode which is assisted by means of one or more driver assistance systems. For example, an operating mode assisted by means of a driver assistance system up to the degree of automation 1 or 2 (for example as per the definition by the BASt; "Bundesanstalt für Straßenwesen" (German Federal Highway Research Agency); more statements in this regard further below) constitutes a substantially manual driving mode. In particular, the device is designed to, in the at least one interpretation operating mode, implement one or more actuating actions which are imparted in a first time interval by the driver not in a first time interval but, in a manner dependent on a predetermined condition, later in a second time interval.

Here, it is also possible for a certain time interval to be, in effect, "gained" by virtue of data processing for the ascertainment of an expedient interpretation being implemented. In particular, the device is configured to select an expedient second time interval for the implementation of the suitably interpreted actuating action. In particular, the second time interval may be selected such that expediently required data for the interpretation of the one or more actuating actions can be ascertained (to an adequate extent). It is thus possible, for example, to make very great savings on resources because it is not necessary for elements to be made in advance for every conceivable actuating action. Nevertheless, the device may be configured to in particular predictively ascertain and store data which are helpful for an interpretation of at least one or more actuating actions that have not yet been input. Furthermore, the device may be configured to ascertain the data of an interpreted actuating action.

Provision may be made whereby the implementation of the movement of the vehicle in accordance with an interpreted actuating action or in accordance with the ascertained data of an interpreted actuating action is performed in a manner dependent on at least one predetermined condition. Here, for an identified actuating action, two or more variants of the interpretation may be ascertained. It is thereupon possible for the at least two variants of the interpretation to be compared with at least one predetermined condition and for the result of the comparison to suitably be taken into consideration. It is also possible for at least two variants of the interpretation to be compared with one another and/or for the at least two results obtained from the comparison of the at least two variants with one or (in each case) at least two predetermined conditions to be aligned with one another. In a simplest case, it is possible for the at least two variants to be checked with regard to the at least one predetermined condition. Here, the check of the at least one predetermined condition or an alignment with the at least one predetermined condition may be performed already before the at least one actuating action, during the actuating action and preferably shortly before or during the implementation of the corresponding or suitably interpreted movement of the vehicle.

The at least one interpretation operating mode may be activatable in a manner dependent on a variable which represents the degree of driving automation, in particular such that the at least one interpretation operating mode is activatable, deactivatable or variable for different degrees of automation with different levels of the haptic contact between the driver and the actuating element. Here, it may for example be established that a sufficient present degree of automation, and/or a sufficient degree of automation predicted at least for the near future, is available. For example, if a degree of automation is available with a variable which represents the degree of automation overshooting a first predetermined threshold value, the interpretation operating mode may be activated or made capable of being activated by means of an (additional) input by the driver, or also made capable of being varied. Also, the interpretation operating mode may be configured to be automatically deactivatable or capable of being varied if the variable which represents the degree of automation undershoots a second predetermined threshold value. Here, the interpretation operating mode may be activated or deactivated in a manner dependent on a variation of the variable which represents the degree of automation, in particular in two or more stages or as at least two different first operating modes.

In a refinement, the interpretation operating mode may be activatable, deactivatable or variable in a manner dependent on the level of the haptic contact of the driver of the vehicle with a grip surface of the actuating element. Here, different surfaces of the actuating element may be configured with different sensitivities to the haptic contact or different interpretations of the haptic contact, which is normally performed using at least one hand of the driver or user of the vehicle. Specific grips or grip types (or manners of gripping, that is to say the manner in which the actuating element is gripped) may be predefined for the initiation of the interpretation operating mode. Such specific grips need not be held, that is to say maintained, continuously. In this way, it is for example possible for the interpretation operating mode to be switched on or activated in accordance with the situation, dynamically, with regard to particular actuating actions, which are possibly yet to follow. Alternatively or in addition, the interpretation operating mode may also be activatable without a preceding action or prerequisite having to be fulfilled by a driver of the vehicle, as it were as a "standard variant". For example, the interpretation operating mode may be activatable more or less automatically if no separate second predetermined condition is applicable.

The expression "operating mode" or "interpretation operating mode" may, in the context of this document, be understood as a type of operation. This may also correspond to a type of operation normally provided for the vehicle.

Furthermore, the interpretation operating mode may be initiable separately from or preferably together with a variation of the vehicle settings, for example together with a so-called driver experience switch, with a variation of chassis settings etc. This gives rise to numerous advantages. The operating mode may, but need not, be initiated by means of an abrupt transition. This may also be combined with one or more further operating modes of the vehicle and/or settable in stages or in substantially continuous fashion. Also, the interpretation operating mode may for example be activatable or variable automatically in a manner dependent on a road type, position or state of the user.

If no manual mode is implementable in the vehicle, the manual mode mentioned in the independent claim may serve as a comparison in relation to a conceivable manual mode. The presence or activatability of an implementable manual driving mode in the vehicle is not a prerequisite for a device according to the invention or for a corresponding operating method.

A device according to the invention or a corresponding operating method may be designed such that an interpretation of the one or more actuating actions imparted by the driver is implemented, or such that a degree of the interpretation is increased, if the level of the haptic contact lies below a first threshold value and/or is decreasing. For example, in a manner dependent on the level of the haptic contact, in particular in a manner dependent on a particular variation of the level of the haptic contact, particular features of the actuating action or order of magnitude of one or more variations of the features and/or parameters of the actuating action may be made interpretable. In other words, a degree of the interpretation, in simplified terms a degree of freedom of the device to interpret an actuating input (or actuating action or actuating activity) of the driver, for example in the direction predetermined criteria, may be dynamically variable during operation.

Here, the degree of interpretation relates in each case in particular substantially only to a particular actuating action. For example, this is varied in relation to the actuating action or activity input at the same time, shortly before or shortly thereafter. In particular, the device is (also) configured to vary the degree of the interpretation in the case of a movement of the vehicle which has already commenced or which has been specified in advance using means of the vehicle. In a situation in which an interpretation of the actuating action does not correspond to the intentions of the driver, the driver may—in one example—also vary the degree of interpretation, by means of a variation of their haptic contact—after an initial interpretation of the actuating action. For example, the driver of the vehicle may, in the case of a highly dynamic variation of the driving situation (such as is typical in an urban environment), vary a degree of the interpretation of their actuating activities/actuating actions in each case very quickly, for example within a time of less than one or two seconds. Here, this is done even without a separate actuation of a further actuating element, for example also without the hand being removed from the steering wheel.

The variability according to the invention of the degree of the interpretation, as described in this document, is particularly suitably accommodating to the human brain, because a multiplicity of human impulses, in particular those related to monitoring of a present event, are, in the human nervous system, especially in particular regions of the brain, very closely linked to the parameters of muscle tensioning of the person (and for example also of their hand). The corresponding information paths within the human nervous system can also be activated extremely quickly, for example by contrast to a conscious evaluation of puzzles. Here, the invention also includes an observation that a change in muscle tension in a human hand can occur very quickly, for example more quickly than a movement of the hand as a whole. At the same time, executions of hand movements, for example particular rotational movements, for example those which a driver performs at a steering wheel of the vehicle for the purposes of steering, can, by humans, be individually metered substantially in parallel and implemented with the variation of the haptic contact, as described in this document, even without mutual influencing. Inter alia, an interaction according to the invention also causes physiologically and/or hormonally induced improvement in the mental and emotional state of the driver. This can also give rise to improved perception and attentiveness of the driver in traffic.

It is highly likely that, by means of a device according to the invention, or by means of a driving experience resulting therefrom, a so-called flow state, known for example from so-called flow theory or also in an expanded sense, can be promoted. Here, the interaction according to the invention with the vehicle can generate a mental state of immersion and absorption in activity, for example in the manner of a frenzy of creativity or frenzy of activity or also desire for action. Several features of the present invention influence especially particular perception mechanisms of the person. This can in turn lead to a major increase in driving pleasure—which, as is known, is a motto of the applicant of the present invention—and, here, to the pleasure of the driver in the interpretation operating mode described here.

In a further example, the driver can, if they have decided for example at relatively short notice that the vehicle should change lanes without the driver having monitored in advance an area to the rear for a sufficient length of time, rotate or move the actuating element with relatively relaxed haptic contact and/or with a predefined grip pattern of the hand on the actuating element, in the direction of the desired lane. Here, such an actuating action (possibly highly spontaneous, performed at short notice) in itself does not lead to any direct risk. In this example, the device can identify a broad degree of interpretation. Figuratively speaking, the device understands the intention of the driver as a whole as being that the driver wishes to change lanes, which is nevertheless not a firm specification, and that the specification must not be implemented if there is a disadvantage associated therewith, or that no significant risks are taken in the process, and/or that the specification must not come at the cost of an (excessive) obstruction of other traffic participants. Here, in turn in a manner dependent on present or previously stored data available in an associated electronic controller unit, the device can decide, within a certain scope of interpretation, whether, when and/or how exactly the lane change desired by the driver is implemented.

If—continuing this above example—the driver is certain, owing to their human judgment, that they wish to change lanes, in particular immediately change lanes, even if their action possibly does not correspond to, for example, good behavior, the driver can, in association with their actuating action, set or vary a second level of the haptic contact with the actuating element, for example, using the surfaces of their hands, grip the steering wheel with relatively firmer haptic contact and/or grip the steering wheel with a second predefined grip pattern of the hand. Here, the device may, in turn in a manner dependent on the present or previously stored data available in an abovementioned controller unit, check for example only the most important criteria within a certain scope of interpretation, for example check only that the initiated movement does not lead to an accident, and thereupon perform the lane change, in particular immediately or as soon as possible.

In this context, it is expressly pointed out that the present invention relates both to a (dynamic) change in the degree of the interpretation and/or to a change in the features of the interpretation, for example with regard to the type of admissible or desired interpretation. The degree of the interpretation may for example denote a scope of variation for one or more features of the actuating action/actuating activity, which features can then be utilized for an interpretation of the at least one operating activity (for example in order to satisfy a further criterion). Furthermore, the device may be configured to vary the interpretation itself, for example one or more rules for the ascertainment of the features and/or parameters of a vehicle movement to be performed on the basis of the (suitably interpreted) driver demand (transmitted by way of their actuating activity or action), in a manner dependent on one or more features or parameters of the actuating action, in particular dynamically, in a manner dependent on the haptic contact with the actuating element.

A device according to the invention or a corresponding operating method may be designed such that no interpretation of the one or more actuating actions imparted by the driver is implemented, or a degree of the interpretation is reduced, if the level of the haptic contact lies above a second threshold value and/or is increasing. For example, in this way, the driver can, for example if they wish to perform a driving maneuver which, in the form of the available vehicle equipment, either cannot be performed with sufficient automation, cannot be performed sufficiently safely, cannot be performed with sufficient performance in the opinion of the driver, or cannot be performed in accordance with the demand of the driver, in particular already before performing their actuating input, ensure, by way of a changed level of the haptic contact, that their specifications contained in their actuating activity, in particular all or particular features and/or parameters of the actuating activity, are not deviated from, or are deviated from only to a limited extent, in particular to the extent specified by them, by the device according to the invention, or in a corresponding operating method.

In one example for this, the driver of the vehicle, which for example predominantly utilizes a high degree of the interpretation, can, in accordance with their desire or in a manner dependent on a special situation, which is generally hazardous or cannot be sufficiently assisted, or cannot be assisted in accordance with the demand of the driver, by the vehicle which can be driven in at least partially automated fashion, even possibly without removing their hands from the steering handle, constrict the degree of the interpretation virtually immediately and in particular to a desired extent. Also, the driver can thus vary the characteristics of the interpretation per se. Here, the driver can for example briefly, or for a particular time interval, cause the vehicle to perform an actuating action which is possibly "not to the vehicle's liking", or is "not comprehensible" to the vehicle, or is not assisted by the vehicle in the scope of the interpretation, or infringes stored criteria of the vehicle, for example a form of self-protection criteria, or infringes a stored regulation for complying with traffic rules or a particular behavior codex of the vehicle.

In a further example, the driver of the vehicle which does not utilize interpretation, or utilizes a relatively low degree of the interpretation, can, in accordance with their desire or in a manner dependent on a special situation, which is generally hazardous or cannot be dealt with sufficiently by the driver alone, even possibly without removing their hands from the steering handle or from the actuating element, expand the degree of interpretation virtually immediately and in particular to a desired extent (intentionally, or in a desired manner). In this case, there is in turn an advantage owing to a faster reaction capability of the driving automation in the particular driving situation.

Furthermore, the degree of the interpretation of the one or more actuating actions imparted by the driver in a first time interval may be variable in at least two stages or in continuous or quasi-continuous fashion in a manner dependent on the level of the haptic contact. Furthermore, the level of the haptic contact between the driver and the actuating element may encompass a pattern of the haptic contact based on the pressure applied to the actuating element by at least one hand of the driver. Furthermore, the level of the haptic contact between the driver and the actuating element may encompass a pattern of the haptic contact on the basis of an areal pattern of capacitively detected measured values. Furthermore, a degree of the mechanical, in particular mechatronically implemented coupling at least of a second part of the actuating element in relation to a fixed position in the coordinate system of the vehicle may be controlled or settable, wherein the second part of the actuating element differs from a first part, which comprises the grip surface, of the actuating element. Finally, a variation of the degree of the interpretation of the one or more actuating actions imparted by the driver, and/or of the coupling of the actuating element (within parts thereof which are movable relative to one another—compare the German patent application with the file reference 102016217772.9, which does not constitute a prior publication, cited in the introduction) or of a part thereof, may be dependent on an action, which overshoots a predetermined level, by the driver on another actuating unit for the control of the vehicle. Here, another actuating element may for example or in particular be an actuating element which can be actuated using a foot, for example an accelerator pedal.

Furthermore, a device according to the invention or a corresponding operating method may be designed to identify a takeover desire, a steering capability and/or a driving authorization (for example driving license) of the driver, in particular with regard to a (for example particular) driving task, and to control the degree of the interpretation of the one or more actuating actions imparted by the driver, and/or of the coupling of at least one part of the actuating element, in a manner dependent on the identified level of the takeover desire and/or of the takeover capability. For example, the degree of the interpretation may be significantly increased if it is identified that a driver is not capable of driving, for example is jeopardized in terms of health or is under the influence of alcohol. Furthermore, a criterion with regard to a driving license and/or the age of the driver, for example too young (younger than a first number of years) or older than a second number of years, may be identified, and the degree of the interpretation of the one or more actuating actions imparted by the driver, and/or of the coupling of at least one part of the actuating element to another element, may thereupon be suitably varied. All features of the invention may furthermore also be applied dynamically and in a manner dependent on the features of a driving situation and/or of a traffic situation.

Provision may be made whereby, in a manner dependent on the level of the haptic contact, in particular in a manner dependent on the pattern of the haptic contact, it can be identified that an actuating action has been specified by a child, and whereby a predefined variation of the degree of the interpretation of the one or more actuating actions imparted by a child and/or of the degree of the coupling is thereupon applied. Furthermore, provision may be made whereby a present or predicted driving situation and/or a maneuver which is to be implemented presently or in the near future is ascertained, and different levels of the haptic contact are thereupon applied as prerequisite for a variation of the degree of the interpretation of the one or more actuating actions imparted by the driver and/or of the coupling. Here, too, it is possible, for example for a driver who is too young or inexperienced, for particular driving situations to be defined in which a degree of the interpretation and/or particular rules with regard to an interpretation can be applied. This yields the advantage that a driving beginner can learn the ability to control a motor vehicle in a step-by-step manner much less dangerously than in a conventional vehicle. For example, here, the degree of the interpretation may be selected to be higher for relatively hazardous driving situations than for normal or non-hazardous driving situations.

Discussing briefly the expressions "driving situation" and "traffic situation", the driving situation is preferably characterized by the following features or parameters:
- a (particular) spatial distribution and/or movement parameter of the traffic participants, in particular a distribution pattern of the traffic participants, in the surroundings of the vehicle,
- a (particular) spatial distribution of immobile objects in the surroundings of the vehicle,
- relative position and/or movement parameters relating to particular types of lane markings, traffic signs, traffic signals (not necessarily relating to particular traffic signals, etc.),
- an item of information relating to the forward travel of the ego vehicle, in particular in relation to particular traffic participants and/or traffic participants actually or at least potentially approaching, or possible approaching, from particular directions, for example from the right or the left on a crossing street.

Preferably, the driving situation may be a driving situation which overshoots particular threshold values or a driving situation which is characterized by parameters which overshoot particular threshold values. For example, the driving situation may be a driving situation which comprises an undesired or hazardous approach to an object or to a traffic participant, an acceleration value which overshoots a threshold value, an undesired arrangement in relation to further traffic participants, etc. The driving situation may be a (seldom occurring) special situation or a hazardous driving situation, for example a driving situation for which an increased risk is ascertained or assumed.

For example, the device according to the invention may be configured to implement, or read in for example from further devices, a classification of a present driving situation applicable for the at least one first time interval and/or for a second time interval and/or for the time after the second time interval. Here, an assignment of a driving situation to one of several predefined classes may be determined. Such a classification may be performed within the respective first vehicles and/or in the remote processing unit.

A driving situation is particularly preferably characterized and/or ascertained on the basis and/or in the form of a pattern, for example of a recognition pattern, wherein the pattern of the driving situation is determined by particular mathematical relationships of the at least two different underlying variables. For example, one pattern is characterized by the respective ego vehicle, that is to say the subject vehicle, having for example a speed at least twice that of another traffic participant, for example a crossing vehicle with or without right of way, a vehicle to be overtaken, etc. In a simplest case, the first driving situation may be a driving situation which is characterized by particular criteria, for example overshooting and/or undershooting of predetermined threshold values.

For example, the device may be configured to, in the case of particular, for example as a result of particular, ones of the stated features, combinations of features or the patterns of the driving situation:
  implement the identified actuating action immediately, for example already in the first time interval,
  freely select a second time interval, wherein this is no later than for example 5, 10, 20, 30, 60 seconds after the first time interval,
  significantly vary, or reject, the implementation of the variation of the movement of the vehicle in relation to the demand identified from the actuating action,
  output an item of information to the driver.

In particular, the expression "driving situation" defined here relates to a driving situation relating to the surroundings of the vehicle of <10, 30, 50, 100, 150 meters. The features of the driving situation may be ascertained by means of a sensor system of the vehicle or from a direct detection of the surroundings. The advantage is thus achieved that the features that are typical for the implementation of drivers' tasks (in the case of manual driving) can also be taken into consideration. In particular, the meaning of the expression "driving situation" differs from a colloquial meaning of the expression "traffic situation".

Alternatively or in addition, the device may be configured to determine or adapt the second time interval also in a manner dependent on a traffic situation. Here, the traffic situation may for example in the form such as it is able to be read out of a navigation system, for example in categories "free traffic", "dense traffic", "slow-moving traffic", "traffic jam" etc.

A device according to the invention or a corresponding operating method may be designed to output at least one haptic signal to at least one part of the actuating element in conjunction with a variation of the degree of the interpretation of the one or more actuating actions imparted by the driver and/or of the coupling and/or to vary, in particular set, at least one haptic characteristic of at least one part of the actuating element in conjunction with the present degree of the interpretation of the one or more actuating actions imparted by the driver and/or of the coupling.

Furthermore, a corresponding electronic control unit and a corresponding computer program are claimed. Here, the electronic control unit may for example also be configured as part of a central computer, which is in particular arranged remote from the vehicle, for example of a backend, wherein a data connection to the vehicle can be established for the operation of the device or for the implementation of the operating method.

It is preferably the case that, for the level of the haptic contact, multiple and primarily, in principle, different extents of the haptic contact are ascertained and taken into consideration, for example whether the steering handle is being held and/or gripped using only one hand or using both hands. The respective manifestation of the haptic contact may however also consist in the locations of the steering handle at which the haptic contact exists and in particular may also be dependent on the force or intensity with which the haptic contact is present.

For example, the level of the haptic contact may be dependent on
  a dimension of the contact area, in particular between the hand (hand area) of the driver and the steering handle of the vehicle; and/or
  a pressure, in particular in the form of the entire contact pressure and/or pressure distribution and/or in the form of the pressure per unit of contact area and/or in the form of a pressure per regions of the hand area which (in a relevant time interval) are in haptic contact or are predicted to be in haptic contact with the steering handle; and/or
  the tautness and/or position of one or more fingers of the driver.

Here, it is preferably possible for particular predefined regions of the steering handle, which (during the steering of a vehicle in one or more different operating modes) are intended to be in haptic contact, or be in haptic contact at a predefined level, with the hand of the user, to be taken into consideration.

For example, the pressure distribution or a pressure distribution pattern on the steering handle may be a preferred measure of the manifestation of the haptic contact. Here, the steering handle may, in the case of a steering wheel, be substantially the steering wheel ring. However, in the context of this document, the expression "steering handle" may also be understood to mean a further, not necessarily circular, actuating element which serves for the control at least of the lateral guidance of the vehicle. Also, the vehicle may be a vehicle which is driveable in virtually fully automated fashion (in a manner dependent on predetermined conditions), wherein the steering handle may then possibly be designed to be extendable and fixable.

The level of the haptic contact may in this case be deleted by means of a preferably expediently configured sensor or steering wheel sensor. A steering wheel sensor may be a sensor which is installed in a part of the steering wheel, for example an expediently refined "hands-on sensor", or a "hands-off sensor". At a device according to the invention, the manifestation of the haptic contact may be an extent and/or a pattern with regard to pressure or electrical capacitance or inductance of the haptic contact between at least one hand of the driver and the steering wheel (or at least one part of the steering wheel). Here, the extent may be locally limited, that is to say for example may be of importance only over certain partial areas of the steering wheel, and accordingly also ascertained only there, and/or the pattern may be an areal pattern. The latter exemplary patterns may be for example an areal pattern and/or a temporal pattern, specifically for example with regard to the applied pressure which is exerted on the steering wheel by one hand and/or two hands of the driver. Such patterns or pressure patterns may be ascertained for example by means of a capacitive or piezoelectric sensor in the steering handle, for example with the aid of a suitable refinement of a hands-on sensor such as is known per se. This may be capable of also detecting, and in particular identifying and classifying, at least two-dimensional patterns. Here, it is also possible for an identification of (individual) fingers to be performed. Preferably, it is also possible for the position or setting of the fingers in relation to the parts of the steering wheel to be ascertained and taken into consideration. It is preferably also possible for the variation (for example a variation of the level of the haptic contact) to be detected and taken into consideration.

The detection of the two-dimensional pattern may in this case be performed by means of a sensor mat installed into the steering handle, for example into the steering wheel ring. Here, the device may also be configured for implementing an at least two-dimensional pattern recognition method, which may for example use the methods of image processing that are known per se. Here, the at least two-dimensional pattern recognition method may be applied to a part of the surface of the steering wheel ring, in such a way that the surface is mapped onto a two-dimensional area. Preferably, the level of the haptic contact is configured by means of a three-dimensional pattern recognition method, wherein at least one dimension represents a profile with respect to time. As a result, it is for example possible to distinguish between 4-16 different levels of the haptic contact, for example in accordance with the patterns identified in the method.

A level of the haptic contact between the driver of the vehicle and the steering wheel may thus encompass a temporal and/or areal pattern of capacitively detected measured values, which are generated by one hand and/or two hands of the driver on the steering handle of the vehicle. An implementation of an inductive sensing principle is self-evidently alternatively or additionally also possible. In addition or alternatively, a camera system (image capture system) provided in the interior compartment of the vehicle may be utilized to detect the level of the haptic contact between the hands of the driver and the steering wheel (or at least one part of the actuating element for vehicle lateral guidance), for example by means of optical object identification. Such a method-related feature is in this case the identification of the manifestation or of the level of haptic contact between the driver and the steering wheel (or the like) and possibly of a suitable reaction to this.

The level of the haptic contact can thus be described or represented by a measure of a capacitive and/or inductive value between the steering handle and the driver (one or two hand areas of the driver). Thus, the level of the capacitive contact and/or inductive contact may be detected for example by means of a capacitive sensor integrated in the steering handle and/or by means of a steering wheel heating wire. Alternatively or in addition, the (physical) pressure or the pressure distribution of the hand (or hand areas) of the driver on the (manual) actuating element for the lateral guidance of the vehicle may be detected. The identification of the haptic contact may in fact then be dependent on one or more pressure values and/or capacitance values or on a change of the pressure values and/or capacitance values which are caused by one or two hands of the driver on the steering handle of the vehicle. Preferably, the haptic contact is represented by one or more particular levels. Here, a distinction may be made between light contact (virtually without force) on the steering handle (for example on the steering wheel ring) by one hand or by two hands and gripping of the steering wheel by one or by two hands of the driver and also a pronounced force coupling between the one or two hands of the driver and the steering handle. The latter may be represented by close and/or areal contact or a corresponding level of the friction force.

According to a further aspect, the invention is characterized by a computer program, wherein the computer program is configured to operate the device in accordance with one or more of the features described in this document and/or to implement the operating method in accordance with one or more features described in this document. In particular, the computer program is a software program which can be executed for example as an app ("application") for one or more types of electronic processing units, preferably on the electronic controller unit. Preferably, the computer program is also configured to take into consideration and aggregate a multiplicity of further information items for the operation of the device and/or for the implementation of the operating method.

According to a further aspect, the invention is characterized by a computer program product which comprises an executable program code and/or data segments, wherein the program code and/or data segments are configured for enabling the electronic unit to implement the operating method in accordance with one or more features of the device or of the method. The computer program product comprises in particular a medium which can be read by the data processing device, or memory areas on a medium or in a backend or cloud on which the program code and/or data segments are stored. According to a further aspect, the invention is characterized by a product which comprises a permanent or restricted authorized right of access to stored data of the computer program product. The computer program product may in this case be in the form of an update to a previous computer program, which, for example in the context of a functional expansion, for example as part of a so-called "remote software update", comprises the parts of the computer program or of the corresponding program code.

The vehicle in the context of this document is preferably a motor vehicle. This gives rise to multiple advantages which are explicitly described in the context of this document and multiple further advantages which are understandable to a person skilled in the art. Nevertheless, the vehicle may also be an amphibious vehicle, a flying vehicle, a watercraft or an agricultural machine.

A particularly great advantage of the invention arises in the case of application to a number of the vehicles selected in accordance with predetermined criteria, for example associated with one or more, for example cooperating brands or members of an organization, of a group of users, of a group of a social network, and so on. Here, the device may also be configured for an expedient exchange of information items on the basis of the data of other vehicles from the number of vehicles. The operating method may therefore also comprise access to the program code and/or data segments, for example for a group of vehicles and/or the users, in unrestricted or restricted form, for example in a form restricted to particular applications or conditions. Furthermore, the invention also comprises a system comprising a number of first vehicles and a number of second vehicles and/or a remote processing unit, for example a backend, for the operation of the vehicles. Furthermore, the invention also encompasses all further functionalities which are utilizable in the vehicle or functionalities of the vehicle which are in turn expediently operable on the basis of the features of the device or in a manner dependent on the information items ascertained in the operating method.

DETAILED DESCRIPTION OF PREFERRED EMBODIMENTS

Further statements or explanations relating to the present invention, which can also be regarded as exemplary embodiments, follow below. Here, it is furthermore also stated that a device according to the invention or a corresponding method is configured in a particular way, though this does not mean that such a configuration is obligatory; rather, optional features are also specified in this manner below.

Below, particular variants of the interpretation of an actuating activity or actuating action of a vehicle user or driver are discussed. These may be assigned to particular levels, identifiable or distinguishable by means of a device according to the invention, of the haptic contact.

For example, in the case of a third level of the haptic contact (a second and a first level will be discussed below), only or predominantly very few vehicle movements can be implementable. In this third level of the haptic contact, the driver must for example hold their steering handle, as actuating element, with above-average firmness in relation to conventional manual driving, specifically using both hands or using a predefined third grip pattern, and/or the driver must hold the actuating element at a third grip surface which is not the normal grip surface. Then, it is also possible to implement an action which identifiably leads to a threat of a collision or involves general risks which overshoot relatively high levels of risks, and/or involves a high disadvantage which overshoots a certain level of normal disadvantages, and/or which does not conform to the most important traffic rules or infringes the predominantly most important traffic rules.

In a continuation of this example, the second level of the haptic contact may correspond to the steering wheel being held with medium firmness, possibly only using one hand or using a predefined second grip pattern, and/or to the actuating element being held at a second grip surface. For example, it is then possible, in the case of a second level of the haptic contact, for actions to be implementable only or predominantly after checking of at least one safety criterion. This at least one safety criterion may for example relate to the following: possible damage or a risk which overshoots a certain level, and/or a possible disadvantage or a disadvantage which overshoots a certain level, and/or
  conformity with and/or infringement of traffic rules, in particular an infringement of traffic rules which overshoots a certain (for example fixedly or dynamically adjustable) level, in particular which is relatively severe.

Here, a check of behavior which substantially conforms to traffic rules and/or to traffic law may be performed, wherein the compliance with the traffic rules is not necessarily enforced by the device.

In a continuation of this example, the first level of the haptic contact may correspond to the steering wheel being held in a very relaxed manner (with below-average firmness in relation to manual driving), possibly only using one hand or using a predefined first grip pattern, and/or to the actuating element being held at a first grip surface, in particular to a placing of at least one hand of the driver on a rest surface. If this first level of the haptic contact is present, an alignment with a multiplicity of predetermined criteria may be performed, for example with regard to a present route, a present destination or an intermediate destination, a situation with respect to time, for example with regard to a planned or desired course of a route or with regard to the arrival at a destination or with regard to an appointed time or event in the future, in accordance with efficiency criteria, for example efficiency criteria, an evaluation of the route, or in accordance with further diverse comparison criteria.

Below, once again, possible examples for actuating activities or actuating actions interpreted (in accordance with the invention) in the interpretation operating mode are specified, or, for different levels of the haptic contact or different grip patterns (in accordance with the above terminology), it is stated what movement the vehicle performs in a manner dependent on various features of the actuating activity. Here, the invention also includes the (basic, qualitative) relationships (which are in particular to be understood as a tendency) between the features of a movement of the vehicle which is to be implemented, which relationships can be implemented in the case of different actuating activities and in the case of different levels of the haptic contact. The individual features of these are described merely by way of example. These may, for example depending on the brand of the vehicle, be varied intentionally within a certain scope, for example in order to achieve a certain differentiation.

Firstly, this is specified for a first level of the haptic contact or a first grip pattern, as defined above:

As regards a direction (of the lateral guidance) predefined by means of the actuating element, this can be adopted, or adopted after an alignment with various criteria. In particular, an adaptation may be performed in accordance with particular criteria, for example in accordance with the present situation in the surroundings. In particular, buffer storage of the information relating to the direction may be performed for up to 5 or 15 or 30 or 60 seconds. As regards the amplitude range specified by means of the actuating element, this may be taken into consideration (in the first level of the haptic contact) as a tendency toward a desired movement. As regards the speed of the actuating action (at the actuating element), this may be taken into consideration as a tendency toward a time horizon for the implementation of a desired movement. As regards the time interval of the actuating activity, this may be selected automatically.

In the case of this first level of the haptic contact, there is substantially no mathematical relationship, or no fixed or direct mathematical relationship, between the actuating activity and the interpretation thereof according to the invention. Here, a position of the actuating element at least during the actuating action and/or during an implementation of the actuating action does not correspond to the wheel setting angle, that is to say the angle set at the steerable wheels. However, a force is exerted on the hand of the driver in accordance with a unilateral or bilateral second dependency on the wheel setting angle in accordance with a logic or a mathematical function.

Below, for a second level of the haptic contact or a second grip pattern, as defined above, it is specified how actuating activities of the driver are interpreted in the interpretation mode:

As regards a direction (of the lateral guidance) predefined by means of the actuating element, this may be adopted, or it is adopted in accordance with a check of a safety criterion. As regards the amplitude range specified by means of the actuating element, this is (in the second level of the haptic contact) taken into consideration as a specification of desired lateral guidance. As regards the speed of the actuating action (at the actuating element), this is taken into consideration in the form of an implementation, of greater or lesser urgency, of a vehicle movement in the particular direction. As regards the time interval of the actuating action, this may be adapted slightly, in particular in the case of a significant demand for adaptation.

In the case of this second level of the haptic contact, one of at least two mathematical relationships which are suitable (for the usage situation), for example characteristic curves for a relationship between the actuating action and the interpretation thereof according to the invention is selected, in particular is adapted. Here, a position of the actuating element during the actuating activity and/or during the implementation of the actuating activity corresponds to a unilateral or bilateral first dependency on the wheel setting angle, in accordance with a logic or a mathematical function. Also, once again, a force is exerted on the hand of the driver in accordance with a unilateral or bilateral second dependency on the wheel setting angle in accordance with a logic or a mathematical function.

Below, for a third level of the haptic contact or a third grip pattern, as defined above, it is specified how actuating actions of the driver are interpreted in the interpretation mode:

As regards a direction (of the lateral guidance) specified by means of the actuating element, this is adopted unchanged. As regards the amplitude range specified by means of the actuating element, this is (in the third level of the haptic contact), substantially adopted, or at most slightly optimized. As regards the speed of the actuating action (at the actuating element), this is substantially adopted, or at most slightly optimized. As regards the time interval of the actuating action, this is substantially adopted, or at most slightly optimized.

In the case of this third level of the haptic contact, use is substantially made of mathematical relationships which are fixed for the respective usage situation, for example characteristic curves.

In a further example (which may be combined with all previous and further features), the device or the operating method may be configured to, in a manner dependent on the level of the haptic contact, allow particular infringements, which for example undershoot particular threshold values, of the traffic rules, in particular infringements up to a first threshold value. A level of the infringement of the traffic rules may be implemented in accordance with a risk which actually arises and/or in accordance with set rules, for example in accordance, in terms of the main features or substantially, with respective penalties which are provided (for example generally in a respective country).

A device according to the invention or a corresponding operating method, or, in simplified terms, the "interpretation operating mode", is configured to set the steering system of the vehicle into an at least partially decoupled state (between the actuating element and one or more actuators which control, in particular in closed-loop fashion, lateral guidance of the vehicle). For example, here, the degree of the coupling is reduced in a manner dependent on particular criteria. The degree of the coupling may be configured to be variable in a manner dependent on the present or attainable degree of automation. Alternatively or in addition, the degree of the coupling may also be configured to be variable in a manner dependent on the ascertained degree of the haptic contact. For example, a setting of the steering system of the vehicle into an at least partially decoupled state, in particular with a degree of the coupling below a certain threshold value, may be performed in a manner dependent on a variable which represents the driving automation and/or on an identified degree of the haptic contact of the driver with the steering handle and/or with a further actuating element. In this example, the at least partial decoupling of the steering system may also be performed in a manner dependent on an identified actuating activity or on an identified intention of the driver to perform a (particular) actuating activity.

During the inputting or imparting of an actuating action or actuating activity by the driver or user of the vehicle, the steering handle or the actuating element exhibits a predefined behavior, in particular a predefined haptic action (as an action or reaction to the actuating action), in relation to the hand of the driver. In this example, this is actively initiated by means of the activation of an actuator of the steering handle.

Below, the expression "degree of automation", or the variable which represents the degree of automation, will be discussed, wherein the measures or category values defined by the VDA (Verband Deutscher Automobilindustrie—German Automobile Industry Association) are used.

Furthermore, a part of the invention comprises that the variable which represents the degree of automation takes particular aspects of the attainable or suitable degree of automation into consideration individually, selectively or in particular combinations. For example, one driving variable which represents the degree of automation may also be selective, with regard to at least two different aspects of the automation of the movement of the vehicle and/or for two or more different driver assistance functions of the vehicle in an abovementioned control unit, for example with regard to longitudinal guidance of the vehicle and/or lateral guidance of the vehicle and/or implementation of a lane change and/or implementation of an overtaking maneuver and/or information items relating to the driver, in particular in conjunction with the control of the vehicle. All of the described features of the invention may in this case be applied separately and differently for different aspects of the automation.

The device is configured to read in, or preferably ascertain on the basis of various data, a variable which represents the degree of automation. In this example, the at least one variable which represents the degree of automation may be ascertained and/or taken into consideration in a manner dependent on the specifications by the driver and/or on a stored actuating history of the driver and/or on parameters or further expedient criteria (for example road type etc.) which are stored in a backend and which can be accessed by the vehicle. One or more features of the method, for example various threshold values, boundary conditions relating to an interpretation of an actuating action by the user, etc., may be implementable or operable in a manner dependent on a category of the variable which represents the present or predicted degree of driving automation of the vehicle (for example, the vehicle is operated in the partially automated driving mode if one or more of the variables lie above a certain value and/or below a certain value), in particular in a manner corresponding to at least one feature of the invention.

In a simplified example, the stages of the degree of automation that are known from the prior art may be taken into consideration. For example, the stages of those degrees of automation which have been defined by the Bundesanstalt für Straßenwesen (BASt) (German Federal Highway Research Agency) (see BASt publication "Forschung kompakt" ["Research compact"], edition November 2012), may be taken into consideration:

According to this, in the case of assisted driving, the driver permanently performs the longitudinal guidance or lateral guidance of the vehicle, while the system performs the respective other function within certain limits. In the case of partially automated driving (PAD), the system performs the longitudinal guidance and lateral guidance for a certain time period and/or in specific situations, wherein the driver must permanently monitor the system as in the case of assisted driving. In the case of highly automated driving (HAD), the system performs the longitudinal guidance and lateral guidance for a certain time period without the driver having to permanently monitor the system; the driver must however be capable of taking over the control of the vehicle within a certain time. In the case of fully automated driving (FAD), the system can, for a specific usage case, handle the driving task automatically in all situations; for this usage case, there is no longer a need for a driver. The above-stated four degrees of automation according to the definition by the BASt correspond to the SAE levels 1 to 4 of the SAE J3016 standard (SAE—Society of Automotive Engineering). For example, highly automated driving (HAD) according to the BASt corresponds to level 3 of the SAE J3016 standard. Furthermore, in SAE J3016, the SAE level 5 is also provided as a highest degree of automation, which is not included in the definition by the BASt. The SAE level 5 corresponds to driverless driving, in the case of which the system can, during the entire journey, handle all situations automatically in the manner of a human driver; a driver is generally no longer necessary.

The at least one variable which represents the degree of automation may (furthermore) represent different aspects of the degree of automation (which can be implemented presently or in the near future). For example, various qualitative and/or quantitative variables of the degree of automation may expediently be taken into consideration. In particular, this concerns aspects of the automation which can be activated or operated at least partially independently of one another. For example, the variable which represents the degree of automation may relate to:

longitudinal guidance of the vehicle and/or
lateral guidance of the vehicle and/or
implementability of a lane change and/or
implementability of an overtaking maneuver and/or
implementability of entry onto a freeway
implementability of exiting a freeway
implementability of an automated turn maneuver, etc.

A variable which represents the degree of automation may also relate for example to a driving maneuver (which is initially possible, or which is possibly desired or expedient) or a particular, possibly impending driving maneuver.

According to a further example, the features of the device or of the operating method are applied to an at least partially automated parking, unparking and maneuvering of the vehicle. Here, features of the method, for example one or more threshold values, for example comparative patterns of the levels of the haptic contact, may be varied in relation to driving at a much higher speed.

Furthermore, a device according to the invention may have a mechanical coupling of the actuating element to an actuator which adjusts the steerable wheels of the vehicle, or may have no such coupling. For example, the device may also be configured on the basis of a so-called drive-by-wire system. In this example, a mechanical coupling may be eliminated at least partially, in particular aside from particular position limits and/or acting force, during the influence on the movement of the vehicle or even before the influence on the movement of the vehicle.

For example, a coupling of one or more wheels of the vehicle and of the actuating element may have a first angle tolerance range which makes it possible for the position of the one or more wheels to be varied in a particular angle range and/or to a particular extent and/or up to a parameter of the lateral force acting on the one or more wheels, at least partially independently of the actuating element. Here, the first angle tolerance range may differ from another angle tolerance range which applies analogously for the actuating element, in particular the steering wheel. In this example, the first angle tolerance range and/or the second angle tolerance range may be in particular (dynamically) controlled in a manner dependent on the level of the haptic contact and/or in a manner dependent on the variable which represents the degree of automation.

As already mentioned, a device according to the invention or a corresponding method provides the driver or user with a new driving experience. At the same time, driving quality and safety are increased without the driver's volition being taken away. Here—instead of inferiority to a machine which is (usually) better capable of driving—the driver has control over the delegation of individual tasks. Here, the driver retains that which they fear to lose in the case of automated driving, specifically their freedom. As in the case of highly automated driving, the driver is generally offered better availability of time, and less attentiveness is demanded of them. For example, the driver can decide to turn off at the next possible turning of the road, and specifies this by means of a relaxed rotation of the (suitably decoupled) steering handle. The driver can thereafter direct their attention to other things, while the vehicle or the device according to the invention suitably implements this specification a short time later.

What is claimed is:

1. A device for operating a vehicle which is drivable in at least partially automated fashion, having an actuating element which is actuatable by a driver and which serves for control of at least lateral guidance of the vehicle, and having a wheel angle adjuster which controls a steering angle at steerable wheels of the vehicle in a manner activated by the actuating element of the driver and/or by an electronic control unit which controls automated lateral guidance of the vehicle, wherein the device has at least one interpretation operating mode which differs from a substantially manual operating mode in that one or more actuating actions imparted by the driver at the actuating element are interpreted in a manner dependent on a degree of haptic contact of the driver with the actuating element, and the device is designed to implement no interpretation of the one or more actuating actions imparted by the driver, or to reduce a degree of the interpretation, if the degree of the haptic contact lies above a first threshold value and/or is increasing.

2. The device according to claim 1, wherein implementation of movement of the vehicle is performed in accordance with an interpreted actuating action in a manner dependent on a predetermined condition.

3. The device according to claim 1, wherein the at least one interpretation operating mode is activatable in a manner dependent on a variable which represents the degree of driving automation such that the at least one interpretation operating mode is activatable, deactivatable or variable for different degrees of automation with different levels of the haptic contact between the driver and the actuating element.

4. The device according to claim 3, wherein the at least one interpretation operating mode is activatable, deactivatable or variable in a manner dependent on the degree of the haptic contact of the driver of the vehicle with a grip surface of the actuating element.

5. The device according to claim 3, wherein the degree of the haptic contact between the driver and the actuating element comprises a pattern of the haptic contact on the basis of pressure applied to the actuating element by at least one hand of the driver.

6. The device according to claim 3, wherein the degree of the haptic contact between the driver and the actuating element comprises a pattern of the haptic contact on the basis of an areal pattern of capacitively detected measured values.

7. The device according to claim 1, wherein the device is designed to implement an interpretation of the one or more actuating actions imparted by the driver, or to increase a degree of the interpretation, if the degree of the haptic contact lies below a second threshold value and/or is decreasing.

8. The device according to claim 1, wherein the degree of the interpretation of the one or more actuating actions imparted by the driver in a first time interval is variable in at least two stages or in continuous or quasi-continuous fashion in a manner dependent on the degree of the haptic contact.

9. The device according to claim 1, wherein a degree of mechatronically implemented coupling of at least a second part of the actuating element to a fixed position in coordinate system of the vehicle is controlled or definable, and
the second part of the actuating element differs from a first part, which comprises a grip surface, of the actuating element.

10. The device according to claim 9, wherein the device is designed to ascertain a present or predicted driving situation and/or a maneuver which is to be implemented presently or in the near future, and to thereupon apply different levels of the haptic contact as prerequisite for a variation of a degree of the interpretation of the one or more actuating actions imparted by the driver and/or of a degree of the coupling.

11. The device according to claim 9, wherein the device is designed to output at least one haptic signal to at least one part of the actuating element in conjunction with a variation of a degree of the interpretation of the one or more actuating actions imparted by the driver and/or of a degree of the coupling, and/or to vary at least one haptic characteristic of at least one part of the actuating element in conjunction with the present degree of the interpretation of the one or more actuating actions imparted by the driver and/or of the degree of the coupling.

12. The device according to claim 1, wherein a variation of a degree of the interpretation of the one or more actuating actions imparted by the driver, and/or a degree of a coupling of the actuating element or of a part of the actuating element, is dependent on an action, which overshoots a predetermined level, by the driver on another actuating unit for control of the vehicle.

13. The device according to claim 1, wherein the device is designed to:
identify a takeover desire, a steering capability and/or a driving authorization of the driver with regard to a driving task, and
control a degree of the interpretation of the one or more actuating actions imparted by the driver, and/or a degree of a coupling of at least one part of the actuating element, in a manner dependent on the identified level of the takeover desire and/or of a takeover capability.

14. The device according to claim 1, wherein the device is designed to identify, in a manner dependent on the degree of the haptic contact that an actuating action has been specified by a child, and to thereupon apply a predefined variation of a degree of the interpretation of the one or more actuating actions imparted by the child and/or a predefined variation of a degree of a coupling of at least one part of the actuating element.

15. An operating method for operating a vehicle which is drivable in at least partially automated fashion, the vehicle having an actuating element which is actuatable by a driver and which serves for control of at least lateral guidance of the vehicle and having a wheel angle adjuster which controls a steering angle at steerable wheels of the vehicle in a manner activated by the actuating element of the driver and/or by an electronic control unit which controls automated lateral guidance of the vehicle,
wherein
at least one interpretation operating mode which differs from a substantially manual operating mode in that one or more actuating actions imparted by the driver at the actuating element are interpreted in a manner dependent on the degree of haptic contact of the driver with the actuating element, and
no interpretation of the one or more actuating actions imparted by the driver is implemented, or a degree of the interpretation is reduced, if the degree of the haptic contact lies above a first threshold value and/or is increasing.

16. A computer program product comprising a non-transitory computer readable medium having stored thereon program code which, when executed on a processing unit, carries out an operating method for operating a vehicle which is drivable in at least partially automated fashion, the vehicle having an actuating element which is actuatable by a driver and which serves for control of at least lateral guidance of the vehicle and having a wheel angle adjuster which controls a steering angle at steerable wheels of the vehicle in a manner activated by the actuating element of the driver and/or by an electronic control unit which controls automated lateral guidance of the vehicle,
wherein
at least one interpretation operating mode which differs from a substantially manual operating mode in that one or more actuating actions imparted by the driver at the actuating element are interpreted in a manner dependent on the degree of haptic contact of the driver with the actuating element, and
no interpretation of the one or more actuating actions imparted by the driver is implemented, or a degree of the interpretation is reduced, if the degree of the haptic contact lies above a first threshold value and/or is increasing.

\* \* \* \* \*